UNITED STATES PATENT OFFICE.

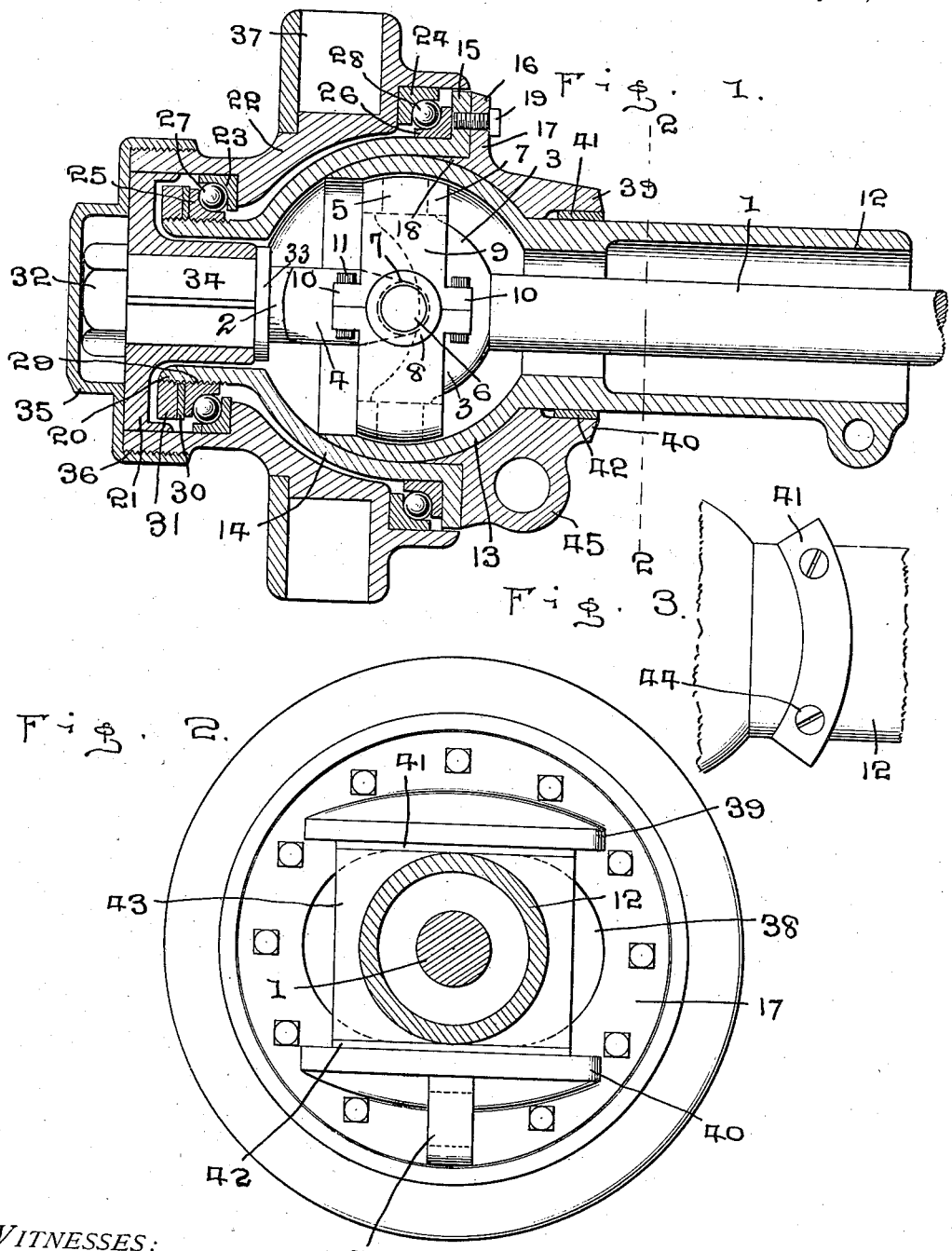

OTTO ZACHOW, OF CLINTONVILLE, WISCONSIN, ASSIGNOR TO THE BADGER FOUR WHEEL DRIVE AUTO COMPANY, OF CLINTONVILLE, WISCONSIN.

WHEEL CONSTRUCTION FOR AUTOMOBILES.

1,028,082.

Specification of Letters Patent.

Patented May 28, 1912.

Application filed August 6, 1909. Serial No. 511,657.

*To all whom it may concern:*

Be it known that I, OTTO ZACHOW, a citizen of the United States, residing at Clintonville, in the county of Waupaca and State of Wisconsin, have invented certain new and useful Improvements in Wheel Construction for Automobiles; and I do hereby declare the following to be a full, clear, and exact description of the invention, such as will enable others skilled in the art to which it appertains to make and use the same.

My invention relates to new and useful improvements in universal joints and wheel bearings therefor and more particularly to that class adapted to be used in connection with motor propelled vehicles, such as automobiles or the like and my object is to provide means whereby the front axle of the vehicle may be driven and the spindle thereof permitted to swing to guide the vehicle.

A further object is to provide means for mounting a wheel on the spindle and a still further object is to provide means for causing the wheel to rotate with the spindle under ordinary conditions; but to have relative movement therewith in case of excessive shock on the wheel.

A further object is to combine with the characteristics named, those of durability, compactness, self protection of the working parts from dust and mud, and withal, of symmetrical and pleasing contour.

Other objects and advantages will be hereinafter referred to and more particularly pointed out in the claim.

In the accompanying drawings forming part of this application, Figure 1 is a longitudinal, central sectional view through the bearings and wheel at one end of the axle. Fig. 2 is a sectional view as seen on line 2—2, Fig. 1, and Fig. 3 is a detail plan view of one portion of the bearing showing the manner of attaching a bearing plate thereto.

Referring to the drawings in which similar reference numerals designate corresponding parts throughout the several views, 1 indicates an axle and 2 a spindle, the meeting ends of the axle and spindle being provided with yokes 3 and 4, respectively at the ends of which yokes are provided trunnions 5 and 6, respectively, said trunnions entering bearings 7 and 8, respectively of a two piece ring 9, the meeting ends of the sections of the ring having ears 10 thereon through which extend bolts 11. By constructing the axle and spindle in this manner and providing the two section ring, the yokes and parts to which they are attached may be forged in one solid piece, thereby strengthening these parts.

Surrounding the axle 1, is a sleeve 12, at the outer end of which is formed a semi-globular housing 13, which housing fits over the universal joint formed by the yokes and ring. Surrounding the open end of the housing 13 is a cup shaped thimble 14, the inner end of which extends a distance beyond the universal joint construction within the housing 13 and is provided with a circumferential flange 15, which engages a similar flange 16 carried by a collar 17 which collar fits over the sleeve 12 and a portion of the housing 13, the inner edge of the collar having a wedge shaped projection 18, which fills the space between the end of the thimble 14 and the curved surface of the housing 13.

The thimble 14 is secured to the collar 17 by introducing a plurality of belts 19 through the abutting flanges 15 and 16 and in view of the curved inner surfaces of the thimble and collar, a close communication is formed between these parts and the semi globular housing 13. At the same time this novel construction provides means whereby said housing may turn within the thimble.

The spindle 2 projects through a band 20 projecting outwardly from the outer end of the thimble 14 and engages a disk 21, that portion of the spindle entering the disk being preferably square in cross section and the opening in said disk conforming in outline thereto, whereby said disk will be rotated with the spindle. The peripheral edge of the disk 21 engages the interior surface of the end of the wheel hub 22, the frictional engagement of the disk causing the wheel hub to rotate and in order to provide a suitable bearing for the hub, bearing rings 23 and 24 are placed adjacent the opposite ends of the hub, while similar bearing rings 25 and 26 are positioned adjacent the ends of the cup shaped thimble 14, said rings having recesses therein to form races for bearing balls 27 and 28, the bearing rings 23 and 25 forming a race for the balls 27 and the rings 24 and 26, races for the balls 28.

The ring 25 is interiorly threaded and is adapted to engage threads 29 on the exterior surface of the band 20 and the rings 23 and 24 rest against shoulders in the hub 22, while the ring 26 bears against the flange 15 and by arranging the rings in this manner, any wear may be compensated for by turning the bearing ring 25 inwardly, which will move the hub endwise and properly position the rings to snugly receive the bearing balls. The ring 25 is held in its adjusted position on the band 20 in any preferred manner as by means of a locking plate 30 and a locking nut 31, thereby holding said ring against rotation. The extreme outer end of the spindle 2 projects through the disk 21 and is engaged by a nut 32, which holds the disk on the spindle, the hub of the disk resting against a circumferential flange 33 at the inner end of the squared portion 34 of the spindle. The outer end of the wheel hub 22 and bearings contained therein are protected from dirt, etc., by means of a cap 35, which fits over the outer end of the hub 22 and engages threads 36 on the periphery thereof and said cap also serves to prevent the nut 32 from leaving the end of the spindle. The opposite end of the wheel hub 22 extends a distance over the flanges 15 and 16 and as said hub fits comparatively close to the periphery of the flanges, dirt, etc., is prevented from entering at that point. The hub 22 is provided around its periphery with a plurality of spoke sockets 37.

In order to permit the spindle 2 to swing forwardly or rearwardly in a horizontal plane to properly guide the vehicle, the collar 17 is provided with an oblong opening 38, through which the sleeve 12 extends and immediately above and below said opening are ledges 39 and 40, respectively, said ledges forming a bearing surface for wear plates 41 and 42, respectively, which are attached to a square shoulder 43 on the sleeve 12 in any suitable manner, as by means of screws 44, the wear plates 41 and 42 being preferably curved as are also the ledges 39 and 40, the curvature of these parts corresponding to the circle described by the swinging parts. Immediately below and attached to the ledge 40 and collar 17 is an eye 45, to which any suitable form of guiding mechanism is to be attached.

It will thus be seen that I have provided a very cheap and economical form of means for using a portion of the driven axle for guiding the vehicle and it will likewise be seen that by driving said wheels through the medium of the frictional engagement of the disk with the hub of the wheel, this friction may be so regulated by any proper means as to sustain a fixed relation between the wheel and disk under ordinary conditions but to allow of relative movement in case the wheel receives excessive shock which might otherwise cause a torsion of the axle beyond its elastic limit, and it will also be seen that by forging the yokes of the universal joints, with the parts to which they are attached, said parts will be extremely strong and durable and less expensive to manufacture.

What I claim is:

In a vehicle wheel, the combination of a hub member comprising a cylindrical portion and series of spoke sockets, a disk having a peripheral friction surface seated within the cylindrical portion of the hub and having a central rectangular opening therethrough, an axle and a spindle connected by a universal joint, the spindle having a rectangular portion fitted into the opening of the disk, a thimble having a semi-globular portion surrounding the universal joint and having the hub rotatably mounted thereon and having a radially extending flange, a member comprising a sleeve which surrounds the shaft and a semi-globular shell interposing the universal joint and the thimble and movably fitted into the latter, and an annular member comprising a collar having a concaved surface fitted to the semi-globular inner member and having a radial flange secured to the flange on the thimble.

In testimony whereof I have signed my name to this specification in the presence of two subscribing witnesses.

OTTO ZACHOW.

Witnesses:
C. A. NEALE,
H. J. JACOBI.